United States Patent
Ennerdal et al.

(10) Patent No.: US 6,672,619 B1
(45) Date of Patent: Jan. 6, 2004

(54) SAFETY DEVICE

(75) Inventors: Leif Ennerdal, Alingsås (SE); Stig Pilhall, Trollhättan (SE); Dan Persson, Alingsås (SE)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 10/019,774

(22) PCT Filed: Jul. 6, 2000

(86) PCT No.: PCT/SE00/01436

§ 371 (c)(1),
(2), (4) Date: Apr. 9, 2002

(87) PCT Pub. No.: WO01/02220

PCT Pub. Date: Jan. 11, 2001

(30) Foreign Application Priority Data

Jul. 6, 1999 (GB) ............................................. 9915824
Jul. 6, 1999 (GB) ............................................. 9915827

(51) Int. Cl.⁷ ............................................. B60R 21/06
(52) U.S. Cl. ..................... 280/749; 280/748; 280/751; 280/753
(58) Field of Search ................. 280/748, 749, 280/730.2, 730.1, 751, 753

(56) References Cited

U.S. PATENT DOCUMENTS 3,650,542 A  *  3/1972  Shimano et al.
5,226,672 A  *  7/1993  Husted ........................ 280/749
5,462,308 A      10/1995 Seki et al.
5,707,075 A      1/1998  Kraft et al.

FOREIGN PATENT DOCUMENTS

| DE | 44 20 156 A1 | 12/1994 |
| FR | 2 755 924 A1 | 5/1998 |
| WO | 93/09977 A1 | 5/1993 |
| WO | WO 95/12504 | 5/1995 |
| WO | 95/21753 A1 | 8/1995 |

* cited by examiner

Primary Examiner—Eric Culbreth
(74) Attorney, Agent, or Firm—Venable LLP; Robert Kinberg

(57) ABSTRACT

A safety device for use in a motor vehicle includes a restraining element in the form of a net (4) initially stored within a housing (3) extending across the entire upper edge of a windscreen (2). Pull cords (5, 6) attached to the edges of the net extend downwardly past guides (7, 8) located adjacent the lower edges of the windscreen to a centrally located drive mechanism (9). Further pull cords (10, 11) extend from positions more towards the central part of the lower edge of the net, and initially extend around the outer periphery of the windscreen being retained by a yieldable mechanism. The pull cords (10, 11) pass guides (14, 15) located adjacent the lower edge of the windscreen (2) and thus to the drive mechanism (9). The drive mechanism applies such a tension to the pull cords (5, 6, 10, 11) that the net is drawn to a position in which it extends tautly across the windscreen (2) in response to an accident situation.

5 Claims, 6 Drawing Sheets

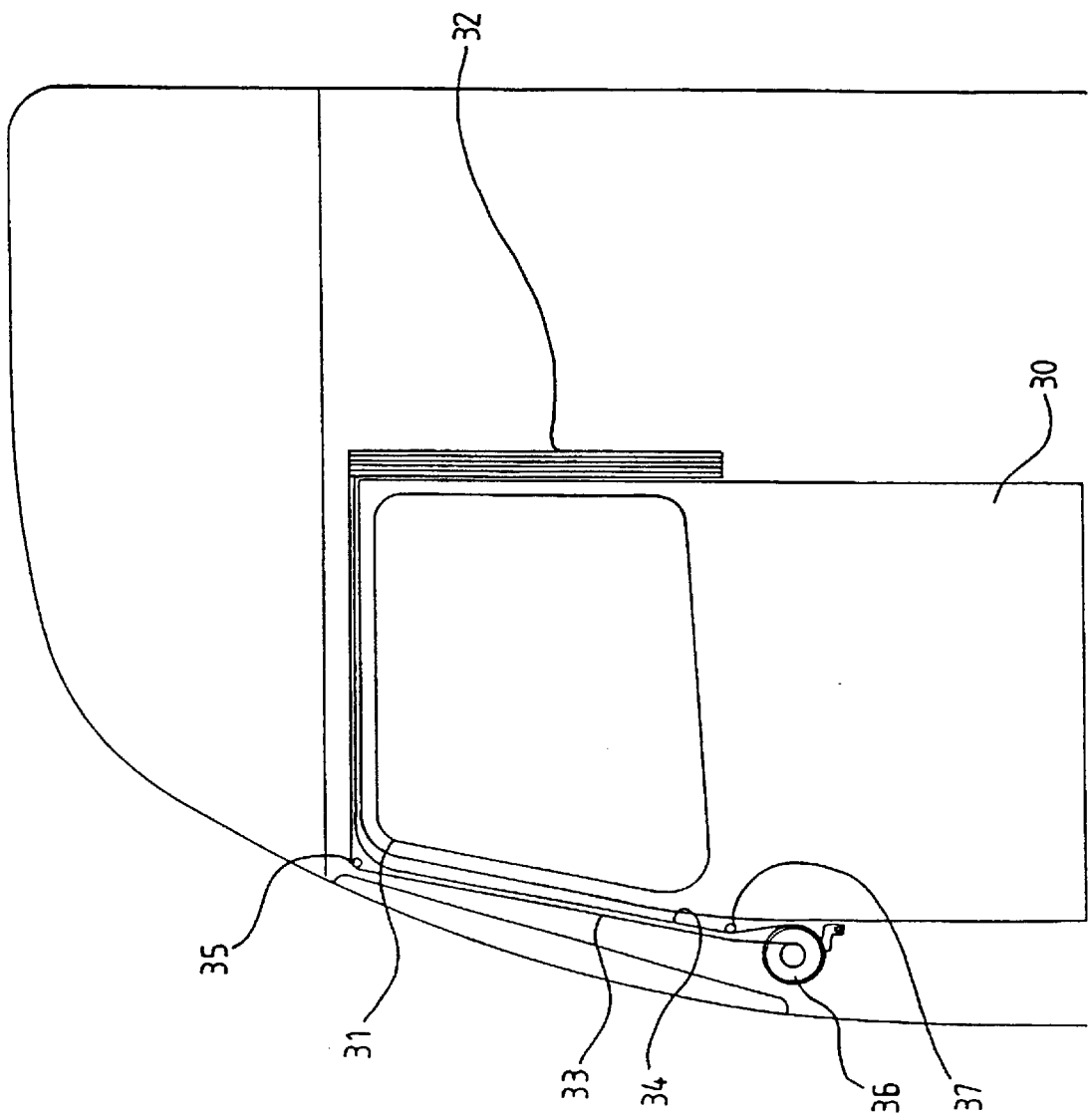

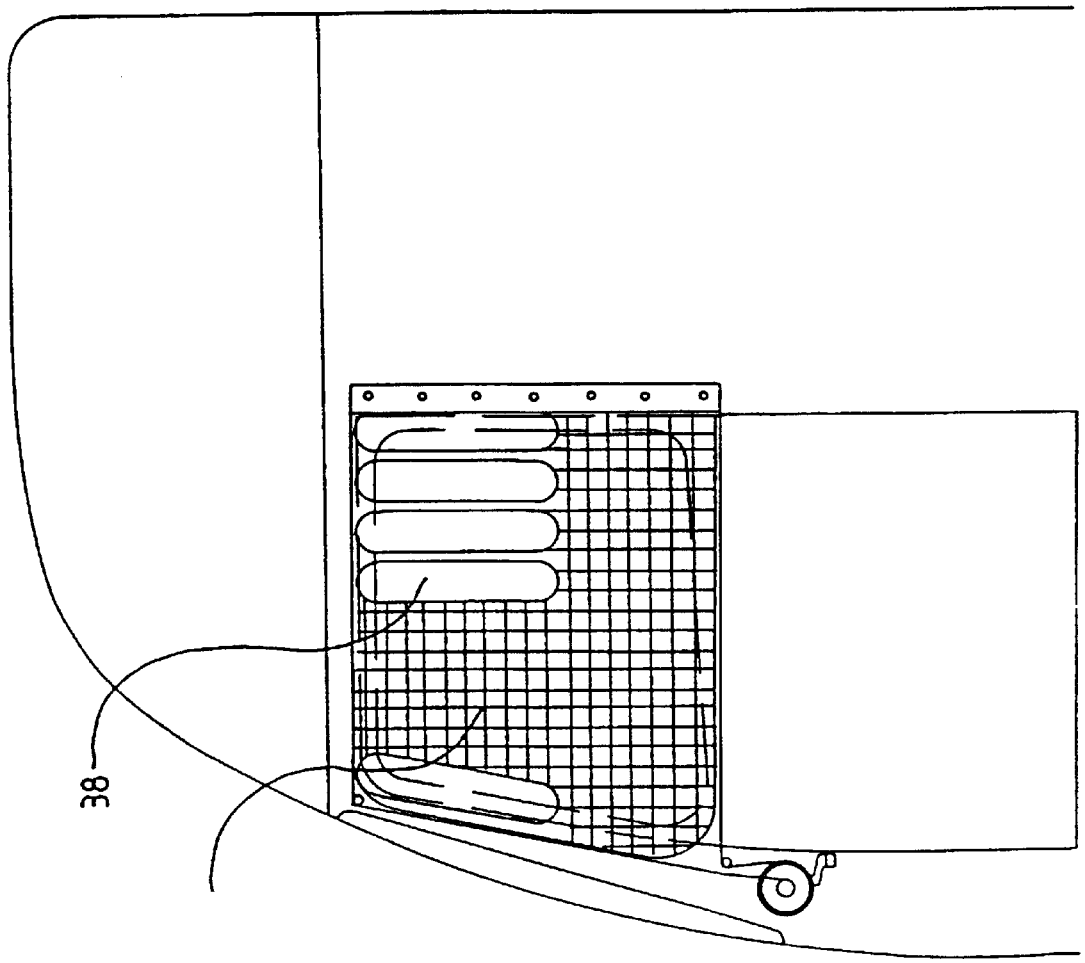

SAFETY DEVICE

THE PRESENT INVENTION relates to a safety device, and more particularly relates to a safety device mounted in a vehicle having a very large front windscreen or windshield, such as a lorry, truck, bus or coach, or a vehicle having a side window.

It has been found that the drivers of vehicles with large windscreens, such as lorries, trucks, buses or coaches, have a tendency not to wear to seat belts. It is difficult to provide a satisfactory air-bag restraint for a driver of such a vehicle, and the present invention seeks to provide a safety device for It has also been found that there is a risk of the drivers of certain vehicles to be thrown out through side windows present in their vehicles in the event that specific types of accident should occur, for example a roll-over accident. Thus the present invention also seeks to provide a safety device for use in minimising the risk of an injury in such a situation.

According to this invention, there is provided a safety device in a motor vehicle, the safety device comprising a restraining element, the restraining element initially being retained at a position adjacent a predetermined side edge of a window or windscreen of the vehicle, the restraining element being associated with a plurality of pull cords, drive means being provided to wind in the pull cords in response to a signal from a sensor responsive to a predetermined deceleration or impact of the vehicle, the pull cords comprising at least two pull cords, each of which is connected to a respective point on the restraining element, said points being spaced apart, and which extend past respective guide means, towards the drive means, at least one pull cord being retained by yieldable means in an initial position in which the pull cord at least partially surrounds the window or windscreen, the arrangement being such that at least said cord is released when the drive means wind in the pull cords, the pull cords serving to draw the retaining element to a position in which it extends across the window or windscreen.

Conveniently, each of the pull cords serves to move the retaining element from its initial position to a position in which it extends across the windscreen or window.

Preferably, one or more pull cords becomes tensioned and serves as a guide along which the remaining pull cords may pull the retaining element.

Advantageously, the drive means are adapted to wind in different pull cords at different respective rates.

Conveniently, the drive means comprise a shaft, means to rotate the shaft in response to a signal from said sensor, the shaft driving a relatively large diameter pulley and a relatively small diameter pulley, the relatively large diameter pulley being utilized to pull in a cord with a relatively high rate and the small diameter pulley being used to wind in a cord at a relatively low rate.

Preferably, the drive mechanism incorporates one or more pulley wheels of the same diameter to drive pull cords, at least one of the pull cords initially incorporating a degree of slack such that when the drive mechanism is actuated, while the slack in the said one pull cord is wound in, at least one pull cord becomes substantially taut.

Advantageously, the restraining element is initially retained in a position above a front windscreen or windshield of a motor vehicle, the pull cords comprising two pull cords, each of which is connected to a respective point on the restraining element, substantially adjacent a side edge thereof, and each of which extends adjacent a respective side edge of the windscreen, past guide means located adjacent the edges of the windscreen towards the drive means.

Conveniently, the safety device comprises at least one further cord, the or each further cord initially extending from a respective point spaced inward of the side edges of the windscreen, around the periphery of the windscreen to the drive means, the or each said further cord being retained by said yieldable means.

Preferably, the pull cords are substantially adjacent a side edge of the restraining element, and which extend adjacent respective side edges of the windshield, past guide means located adjacent the side edges of the windshield.

Advantageously, the said further cords are connected to the restraining device.

Conveniently, the said further cords are connected to the vehicle at points adjacent the restraining element.

Preferably, the drive means are adapted to wind in the first pull cords at a predetermined rate, and are adapted to wind in the said further pull cords at a second, higher, predetermined rate.

Advantageously, the drive means are adapted initially to tension the further cords between said respective points and said guide means located beneath said respective points, and then to apply tension to said two pull cords to deploy the restraining element.

Conveniently, the relatively small diameter pulley is adapted to wind in the said two pull cords, and the relatively large diameter pulley is adapted to wind in the further pull cords.

Preferably, the restraining element is initially retained at a position adjacent a side edge of a window at the side of a vehicle, the pull cords comprising at least two pull cords, one of which is connected to a point adjacent the upper edge of the restraining element and which extends across the top of the window and past guide means and to the drive means, whilst the second pull cord is connected to a point adjacent the lower edge of the restraining element and passes across the top of the window and down one side of the window, whilst being retained by the yieldable means, and past guide means located adjacent the lower edge of the window to the drive means.

In order that the invention may be more readily understood, and so that further features thereof may be appreciated, the invention will now be described, by way of example, with reference to the accompanying drawings in which:

FIG. 5 is a diagrammatic view of the side door of a lorry provided with a safety device in accordance with the invention, and FIG. 6 is a view corresponding to FIG. 5 showing the safety device after deployment.

Figure 1:
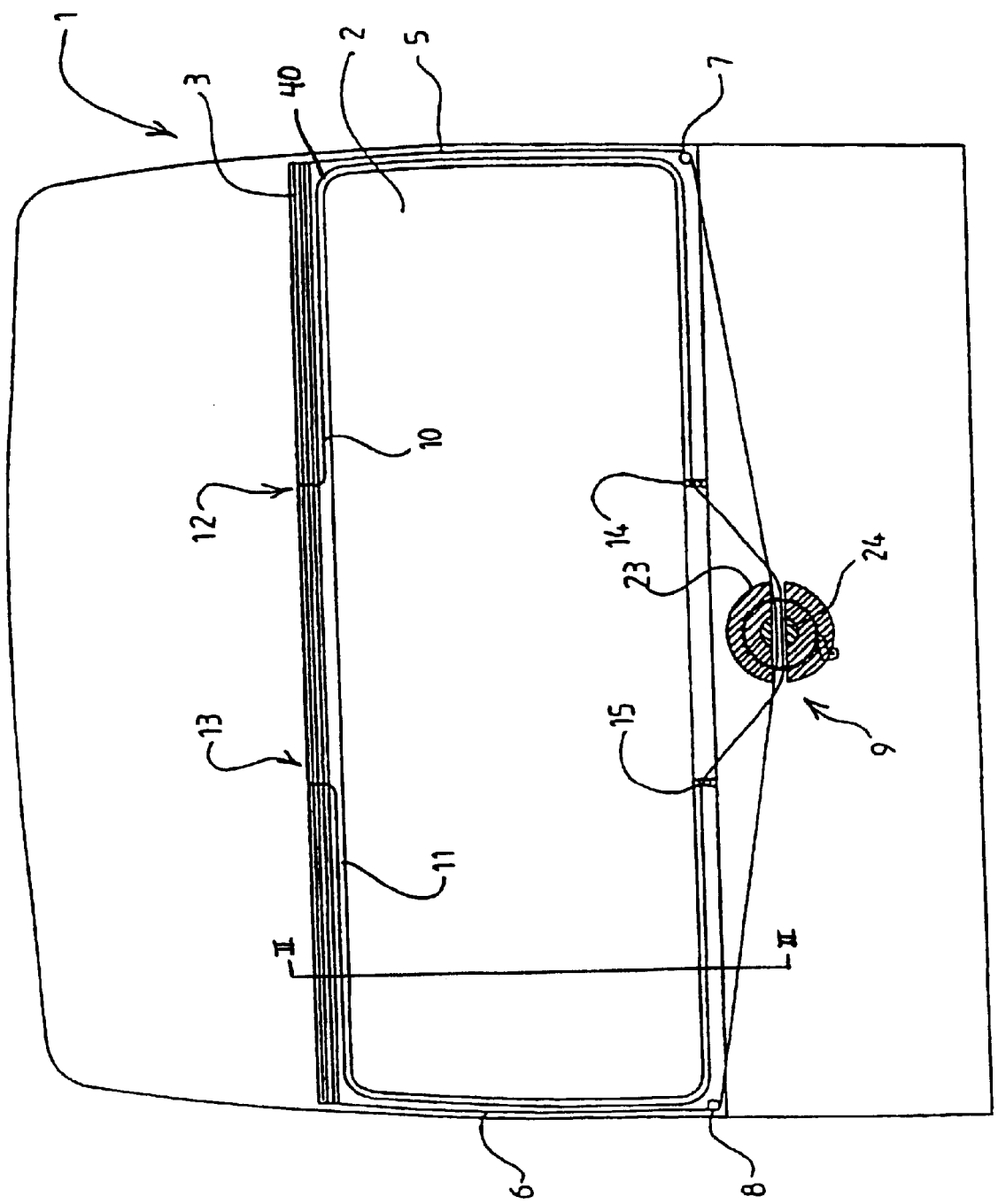
FIG. 1 is a diagrammatic view of the front part of the vehicle provided with a safety device in accordance with the invention, before the safety device is deployed.
Figure 2:
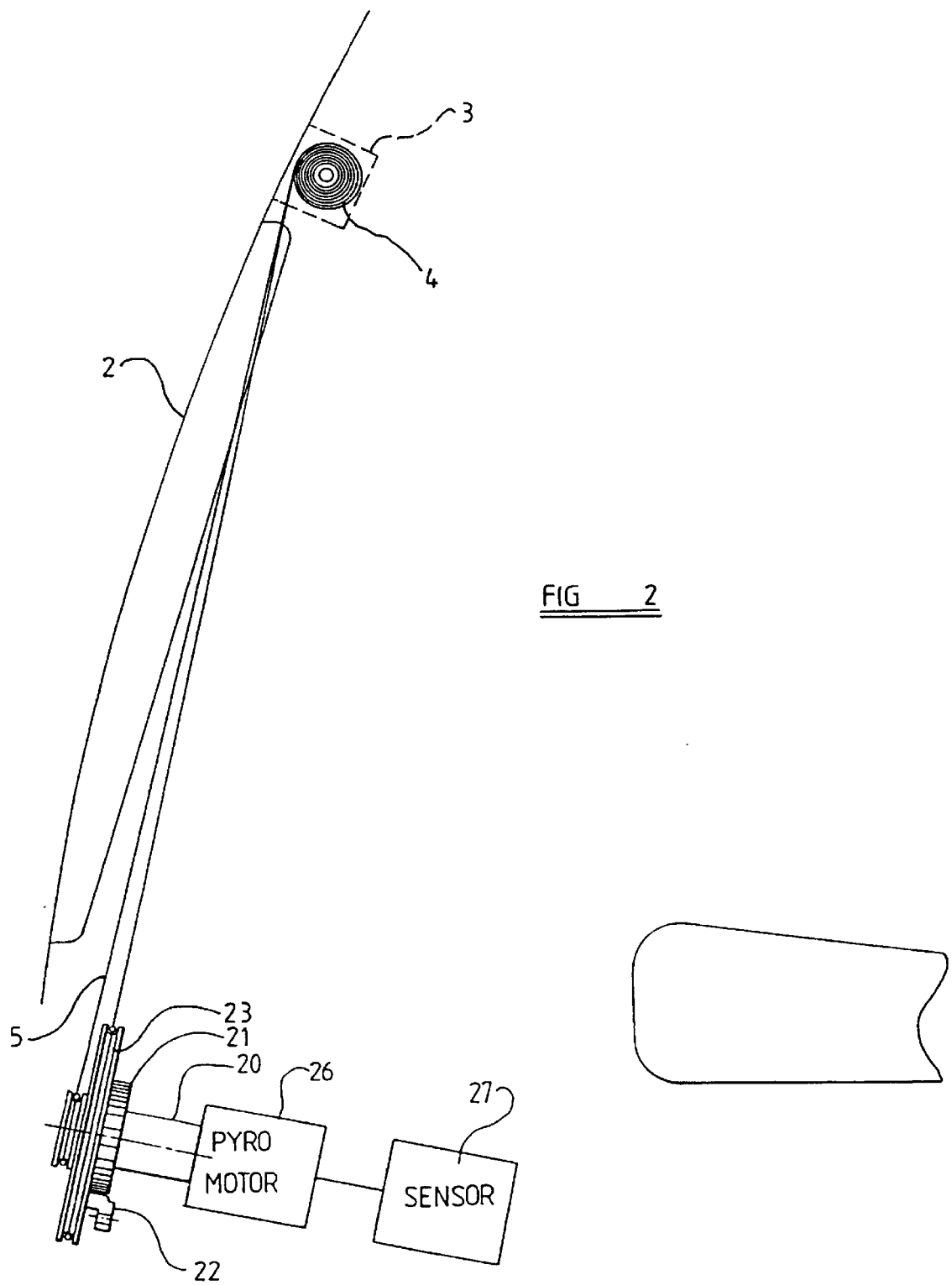
FIG. 2 is a vertical sectional and schematical view taken approximately through line II—II of FIG. 1.

Referring initially to FIGS. 1 and 2 of the accompanying drawings, the front part I of a vehicle is illustrated. The vehicle is in the form of a lorry or truck, bus or coach, and has a large windscreen (or windshield) 2 which extends across the entire width of the vehicle.

Mounted above the windscreen is a housing 3 which extends across the entire width of the windscreen 2. The housing is located adjacent the upper side edge of the windscreen 2. Contained within the housing is a restraining element, in this embodiment in the form of a net 4 (see FIG. 3), although a sheet or some other equivalent restraining device may be used. The net 4, in its initial state, is tightly packed within the housing 3. The net may be rolled on to a spindle, or folded.

Two pull cords 5, 6 are connected respectively to opposed side edges of the net within the housing. The pull cords 5, 6 extend downwardly, on either side of the windscreen 2 to guide means 7, 8 which are located beneath the lower edge of the windscreen 2, and which have a spacing between them greater than the width of the windscreen 2. The pull cords 5, 6 then extend, from the guide means, substantially inwardly and downwardly to a centrally located drive mechanism 9 which is positioned, in the described embodiment, beneath the windscreen 2 and substantially centrally of the vehicle.

In the illustrated embodiment, two further pull cords 10, 11 are provided. These pull cords are connected to the net 4 at points 12, 13, which are spaced inwardly from the side edges of the net 4, and which are thus also spaced inwardly from the side edges of the windscreen 2, the points 12 and 13 being located above the windscreen 2, but being symmetrically located relative to the central vertical axis of the windscreen or windshield 2.

The pull cords 10, 11, extend from the points 12, 13, around the exterior of the windscreen or windshield 2, until the pull cords reach guide means 14, 15 which are located adjacent the lower edge of the windshield respectively immediately beneath the points 12, 13.

The pull cords 10, 11 are retained, between the points 12 and 13 and the guide 14 and 15 by some yieldable means 40, such as a restraining strip formed of a plastics material, so that the pull cords are retained in a position inconspicuously, surrounding the windscreen. In the event that tension is applied to the pull cords 10, 11, the pull cords will move from the initial position surrounding the windscreen to a position in which they extend between the points 12 and 13, and the guide means 14 and 15.

The pull cords 10, 11 extend from the guide means 14, 15 to the drive mechanism 9.

The drive mechanism 9 has, as can be seen most clearly from FIG. 2, a rotatable shaft 20 which carries a toothed wheel 21 adapted to co-operate with a ratchet 22. Thus the shaft may be driven to rotate in one direction, but rotation in the opposite direction is prevented. The shaft 20 carries a relatively large diameter pulley wheel 23 adapted to apply tension to the pull cords 10 and 11, and also carries a relatively small diameter pulley wheel 24 adapted to apply tension to the pull cords 5 and 6.

As can be seen from FIG. 1, the pulley wheels 23 and 24 are provided with a diametrically extending channel which receives a cord portion which inter-connects the pull cords 5 and 6, and which also receives a cord portion which interconnects the pull cords 10 and 11.

The shaft 20 is associated with a pyrotechnic motor 26 adapted to be actuated to rotate the shaft 20 in said one direction in response to a signal from a sensor 27 which senses a predetermined deceleration or impact of the vehicle.

In the event that the sensor senses a predetermined deceleration or impact, the pyrotechnic motor 26 is activated causing the shaft 20 to rotate. As the shaft 20 rotates, the cord portion interconnecting the pull cords 5 and 6 becomes engages with the relatively small diameter pulley wheel 24, and tension is applied to the pull cords 5 and 6. The pull cords 5 and 6 commence to pull the net 4 out of the housing 3.

Simultaneously the portion of cord interconnecting the pull cords 10 and 11 is engaged by the larger diameter pulley wheel 23, and the pulley wheel applies tension to the pull cords 10 and 11. Initially the pull cords 10 and 11 become separated from the yieldable means retaining them in position around the periphery of the windscreen or windscreen 2. This is the situation shown in FIG. 3. The cords 10 and 11, because of their length, are slack. Subsequently pull cords 10 and 11 become tensioned between the points 12 and 13 by which they are connected to the net 4, and the guide means 14, 15.

Because the pull cords 10 and 11 are engaged with the larger diameter pulley wheel 23, as compared with the diameter of the pulley wheel 24 engaging the pull cords 5 and 6, the pull cords 10 and 11 are wound in by the drive mechanism 9 at a faster rate than the pull cords 5 and 6.

Figure 4:
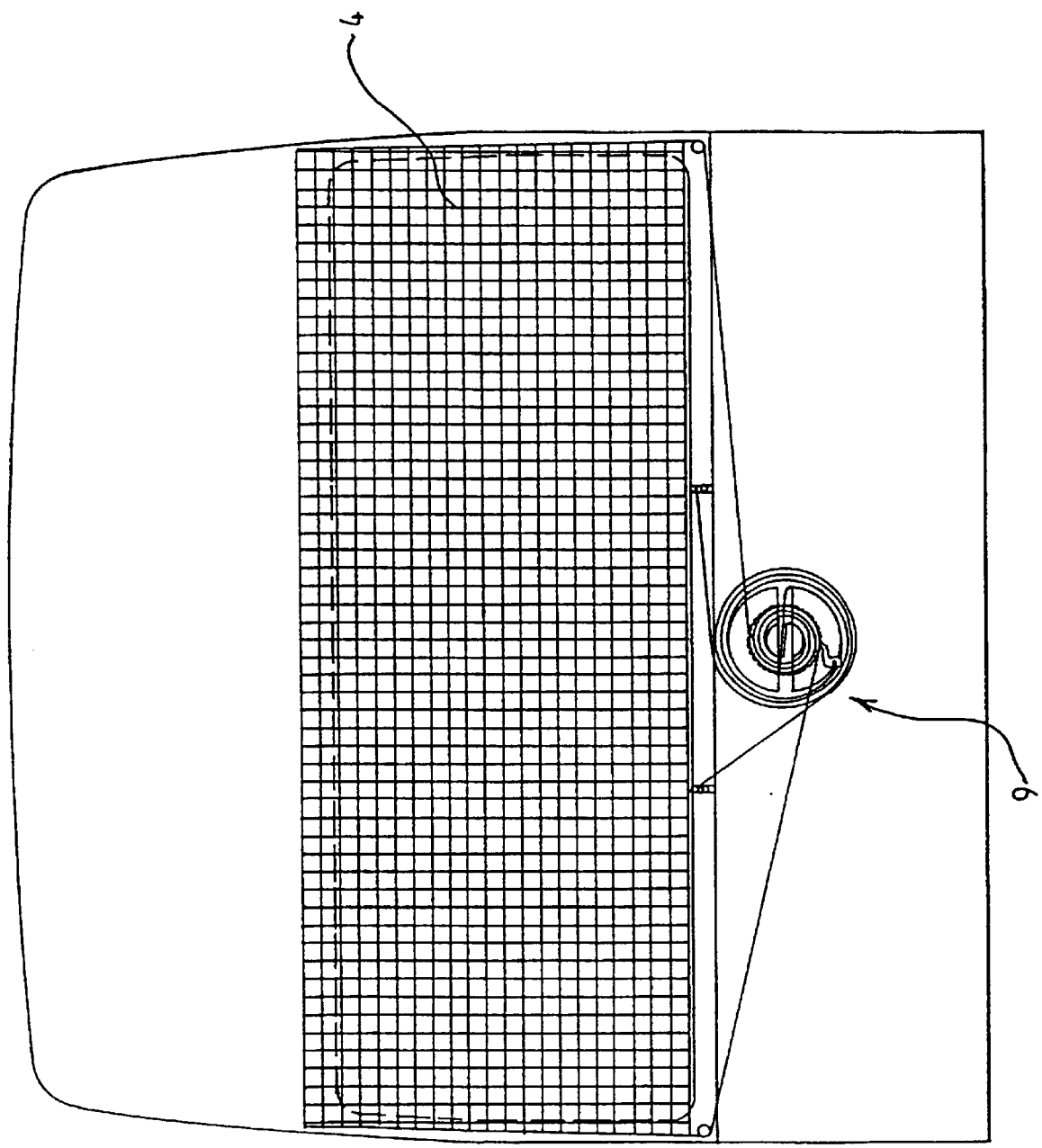
FIG. 4 is a view corresponding to FIG. 1 illustrating the safety device after the safety device has been deployed.

The diameter of the pulley wheels is chosen so that when the net 4 reaches a fully deployed position, as shown in FIG. 4, the pull cords 5 and 6 are fully tensioned, and also the pull cords 10 and 11 are fully tensioned.

The net is thus fully deployed across the windscreen or windshield 2 in front of the driver of the vehicle, and if the driver of the vehicle is thrown forwardly, the driver will be retained by the net.

It is to be understood that in the embodiment described above, a substantially equal tension may be applied by the drive mechanism 9 to each of the pull cords 5, 6, 10 and 11 when the net is fully deployed. When the net is in this position, the ratchet 22 engages the toothed wheel 21, serving to retain the net in the fully deployed position.

It is to be appreciated that whilst the described embodiment relates to an arrangement in which four pull cords are provided, it may be appropriate to use six, or any other convenient number of pull cords, using pulley wheels of appropriate relative diameters. In a simple embodiment there may be a single central pull cord and two side pull cords corresponding to the cords 5 and 6 described above.

Whilst, in the described embodiment, all of the pull cords are used to pull the net down, it is to be appreciated that in a modified embodiment of the invention, only a certain number of pull cords, for example the two pull cords located on either side of the windshield, may pull the net down, and the remaining cord or cords may have their ends not fixed to the net, but instead have their ends fixed to the housing 3 which contains the net. These remaining cords would then become tensioned, acting as guide cords along which the net may move as it proceeds from the initial stored position to the final deployed position, these remaining cords thus providing a substantially taut reinforcement for the net, helping ensure that the net is not distorted when impacted by the driver or occupant of the vehicle.

Whilst in the described embodiment a drive arrangement is provided which involves the use of pulley wheels of different diameters, it is to be appreciated that further alternative mechanisms may be used adapted to apply different "winding" rates to the pull cords so that the desired effect is achieved. In one possible alternative embodiment, the pull cords 10 and 11 may be wound in by the driving mechanism until they extend tightly between the points 12 and 13, and the guide means 14 and 15 before tension is applied to the pull cords 5 and 6. This may be achieved by a drive means including a first pulley wheel adapted to wind in the pull cords 10 and 11, with that pulley wheel being adapted to rotate a predetermined amount (e.g. a predetermined number of turns) before a second a pulley wheel, which winds in the pull cords 5 and 6, commences rotation. Alternatively, the pull cords 10 and 11 may initially be relatively taut, whereas a substantial degree of "slack" may be provided in the pull cords 5 and 6. Thus, on actuation of the drive means, initially the slack is wound in present in the pull cords 5 and 6, while the pull cords 10 and 11 are wound in until they extend substantially tautly between the points 12 and 13, and the guide means 14 and 15. Subsequent movement of the drive means will apply equal tension to all four of the pull cords so that the net is pulled evenly from the stored position to the deployed condition.

Referring now to FIG. 5 of the accompanying drawings the door 30 in a motor vehicle is illustrated, the upper pail of the door being constituted by a window 31.

Mounted adjacent one side of the window 31 is a vertically extending housing 32. The housing 32 extends the entire height of the window 31. Contained within the housing is a restraining element, in this embodiment in the form of a net, although a sheet or some other equivalent restraining element may be used. The net, in its initial state, is tightly packed within the housing 32. The net may be rolled on to a spindle or may be folded.

Two pull cords 33, 34 are provided. The first pull cord 33 is connected to the upper edge of the net contained within the housing 32. The pull cord 33 passes a guide element 35 located adjacent the top of the window 31 on the side of the window remote from the housing 32. The pull cord 33 then extends downwardly to a drive mechanism 36. The second pull cord 34 is connected to the lower edge of the net present within the housing 32. The second pull cord 34 extends upwardly within the housing 32, to emerge from the housing at a point immediately adjacent the point at which the first pull cord 33 emerges from the housing. The second pull cord 34 traverses across the top of the window 31 and, without being engaged by the guide means 37, extend downwardly adjacent the side of the window 31 remote from the housing 32. The pull cord 34 then passes a guide means 37 which is located beneath the level of the lower edge of the window 31, substantially and horizontally in alignment with the lower edge of the housing 32, before the second pull cord 34 passes the drive mechanism 35.

It is to be appreciated that at least the second pull cord 34 is retained, as it passes around the periphery of the window 31, by some yieldable means, such as a restraining strip formed of a plastics material, so that the pull cord is retained in position inconspicuously, as it partially surrounds the window 31.

The drive mechanism 36 may correspond with the drive mechanism 9 of the embodiment described above with reference to FIGS. 1 to 4. The first pull cord 33 may be driven by a relatively small diameter pulley wheel whilst the second pull cord 34 may be driven by a relatively large diameter pulley wheel.

In the event that the drive mechanism 36 is actuated, for example in response to a signal from a sensor which has sensed a particular type of impact or a roll-over situation, the pull cords 33 and 34 will be pulled in by the drive mechanism 36. The second pull cord 34 will be pulled in at a faster rate than the first pull cord 33.

As the first pull cord 33 is pulled in, tension is applied to the pull cord, and the pull cord serves to draw the upper edge of the net present within the housing 32 toward the guide means 37. As the second pull cord 34 is drawn in, initially the pull cord is released by the yieldable restraining strip, and the pull cord is tensioned until part of the pull cord 34 extends substantially tautly between the guide means 37 and the lower edge of the net present within the housing 32. The continued application of tension to the pull cords will cause the net to be drawn horizontally out of the housing 32 until the net extends across the window 31.

This is the situation shown in FIG. 6. It is to be noted that the net incorporates a plurality of inflated cells or air-bags 38. These inflated cells are provided with gas generator means adapted to inflate the cells on deployment of the safety device.

Figure 3:
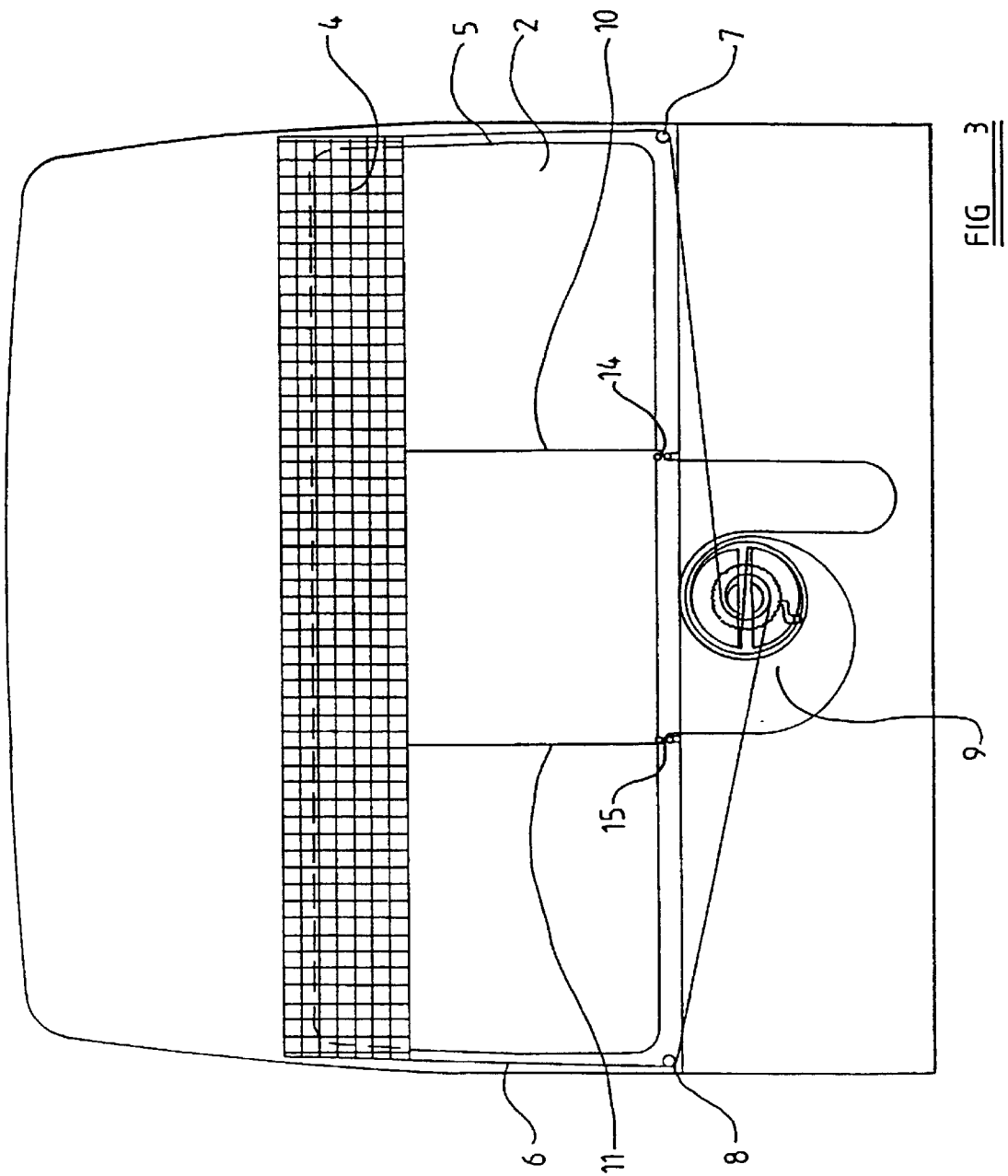
FIG. 3 is a view corresponding to FIG. 1 illustrating the safety device during deployment.

Whilst in the embodiment described with reference to FIG. 4 only two pull cords are utilized, it is to be appreciated that a plurality of pull cords, generally as described with connection to the embodiment shown in FIGS. 1 to 3, may be utilized.

Whilst the invention has been described with reference to embodiments in which a restraining device in the form of a net is utilized, alternative forms of restraining device could be used. The restraining device could comprise a sheet-like material, which might be provided with one or more transparent regions formed therein to assist in visibility in the event that the restraining device is deployed. In a further alternative embodiment the restraining device itself may incorporate one or more inflatable elements adapted to be located for example, adjacent the side pillars of the windscreen or adjacent parts of the door of the vehicle.

In the present specification "comprise" means "includes or consists of" and "comprising" means "including or consisting of".

The features disclosed in the foregoing description, or the following Claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A safety device in a motor vehicle, the safety device comprising a restraining element, the restraining element initially being retained at a position adjacent a predetermined edge of a window or windscreen of the vehicle, the restraining element being associated with a plurality of pull cords, drive means being provided to wind in the pull cords in response to a signal from a sensor responsive to a predetermined deceleration or impact of the vehicle, the pull cords comprising at least two pull cords, each of which is connected to a respective point on the restraining element, said points being spaced apart, and which extend past respective guide means, towards the drive means, at least one pull cord being retained by yieldable means in an initial position in which the pull cord at least partially surrounds the window or windscreen, the arrangement being such that at least said cord is released when the drive means wind in the pull cords, the pull cords serving to draw the retaining element to a position in which it extends across the window or windscreen, wherein the drive means are adapted to wind in different pull cords at different respective rates.

2. An arrangement according to claim 1 wherein the drive means comprise a shaft, means to rotate the shaft in response to a signal from said sensor, the shaft driving a relatively large diameter pulley and a relatively small diameter pulley, the relatively large diameter pulley being utilized to pull in a cord with a relatively high rate and the small diameter pulley being used to wind in a cord at a relatively low rate.

3. A safety device according to claim 1 wherein the restraining element is initially retained in a position above a front windscreen or windshield of a motor vehicle, the pull cords comprising two pull cords, each of which is connected to a respective point on the restraining element, substantially adjacent a side edge thereof, and which extends adjacent respective side edges of the windscreen, past guide means located adjacent the edges of the windscreen towards the drive means.

4. A safety device according to claim 1 wherein the pull cords are substantially adjacent a side edge of the restraining element, and which extend adjacent respective side edges of the window or windscreen, past guide means located adjacent the side edges of the window or windscreen.

5. A safety device in a motor vehicle, the safety device comprising a restraining element, the restraining element initially being retained at a position adjacent a predetermined edge of a window of the vehicle, the restraining element being associated with a plurality of pull cords, drive means being provided to wind in the pull cords in response to a signal from a sensor responsive to a predetermined deceleration or impact of the vehicle, the pull cords comprising at least two pull cords, each of which is connected to a respective point on the restraining element, said points being spaced apart, and which extend past respective guide means, towards the drive means, at least one pull cord being retained by yieldable means in an initial position in which the pull cord at least partially surrounds the window, the arrangement being such that at least said cord is released when the drive means wind in the pull cords, the pull cords serving to draw the retaining element to a position in which it extends across the window, wherein the restraining element is initially retained at a position adjacent a side edge of a window at the side of a vehicle, the pull cords comprising at least two pull cords, one of which is connected to a point adjacent the upper edge of the restraining element and which extends across the top of the window and past guide means and to the drive means, whilst the second pull cord is connected to a point adjacent the lower edge of the restraining element and passes across the top of the window and down one side of the window, whilst being retained by the yieldable means, and past guide means located adjacent the lower edge of the window to the drive means.

* * * * *